United States Patent Office 3,655,817 Patented Apr. 11, 1972

3,655,817

ADDUCTS, CONTAINING EPOXIDE GROUPS, FROM POLYEPOXIDE COMPOUNDS AND ACID, SLIGHTLY BRANCHED POLYESTER DICARBOXYLIC ACIDS

Friedrich Lohse, Allschwil, Rolf Schmid, Reinach, Basel-Land, Willy Fisch, Binningen, and Hans Batzer, Arlesheim, Switzerland, assignors to Ciba Limited, Basel, Switzerland No Drawing. Filed July 23, 1970, Ser. No. 57,774
Claims priority, application Switzerland, July 30, 1969, 11,607/69
Int. Cl. C08g 45/14
U.S. Cl. 260—835 18 Claims

ABSTRACT OF THE DISCLOSURE

New adducts, containing epoxide groups, of polyepoxide compounds and polyesters of succinic acid and 1,4-butanediol which are slightly branched, possess terminal carboxyl groups and have an average molecular weight of about 1200 to 20,000, manufactured by reaction of, for example, 11 mols of succinic anhydride with 10 mols of 1,4-butanediol, with 0.1 to at most 0.65 carboxyl group equivalent of the acid polyester being employed for the (so-called) "advancement" per 1 equivalent of epoxide groups of the polyepoxide compound. By curing with customary curing agents for epoxide resins, the adducts containing epoxide groups can be converted into elastomeric moulded materials which possess a significantly greater hardness and toughness and a surprisingly high crystallization transition point of 70–100° C.

It is known from U.S. patent specification No. 3,027,279 that flexible to rubbery-elastic plastics products can be obtained by curing polyaddition products of acid, linear or branched polyesters and epoxide compounds. Herein, the polymers obtained are the more flexible, the more mobile is the polyester component and the greater is the proportion of the polyester in the cured product.

The cured polyaddition products show either viscoelastic or rubbery-elastic properties. The products which are visco-elastic at room temperature show normal good toughness, but their physical properties are very temperature-dependent, that is to say these products are brittle at low temperatures and at slightly elevated temperature these visco-elastic products change to the rubbery-elastic state having little mechanical strength. In the visco-elastic state the polymers do not show any elastic deformation, that is to say the deformation is very time-dependent. The products which are rubbery-elastic at room temperature are all very soft and show low strength and an extremely low impact strength.

It has now been found that by (so-called) "advancement" of polyepoxide compounds, and in particular of certain cycloaliphatic and heterocyclic polyepoxides, with acid, slightly branched polyesters of succinic acid or succinic anhydride and 1,4-butanediol in certain stoichiometric quantity ratios, novel plasticised curable epoxide resins are obtained which, by curing with customary curing agents for epoxide resins, such as carboxylic acid anhydrides, polycarboxylic acids, polyamines or curing catalysts, can be converted into crystalline elastomeric moulded materials which display significantly higher hardness and toughness as well as a surprisingly high crystallisation transition point of 70 to 100° C. They have a high tensile strength of up to above 1000 kg./cm.$^2$, especially after prior stretching whilst warm.

The polyesters of succinic acid and 1,4-butanediol possessing terminal carboxyl groups, which are used for the (so-called) "advancement" of polyepoxide compounds must be relatively slightly branched, that is to say the recurring structural element of formula

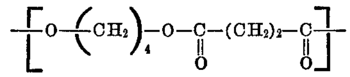

should, in the average polyester molecule, amount to between 99 and 90 mol percent, whilst the difference from 100 mol percent is attributable to the polyfunctional starting molecule (trifunctional or polyfunctional polyalcohol or polycarboxylic acid) responsible for the branching.

Furthermore, the average molecular size of the polyester must lie within certain limits (molecular weight about 1,200 to about 20,000).

Furthermore, 0.2 to at most 0.65 carboxyl group equivalent of the acid polyester must be employed for the (so-called) "advancement" per 1 equivalent of epoxide groups of the polyepoxide compound. Best results are achieved when using 0.4 to at most 0.6 carboxyl group equivalent of the acid polyester.

The subject of the present invention are hence new adducts, containing epoxide groups, of polyepoxide compounds and acid, slightly branched polyesters, characterised in that (a) slightly branched polyesters, possessing terminal carboxyl groups, having an average molecular weight of about 1,200 to about 20,000 and consisting of 99 to 90 mol percent of the structural element of formula

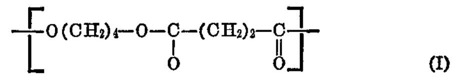

(I)

are reacted with (b) diepoxide compounds, and in particular preferably diglycidyl or di-(β-methylglycidyl) compounds of which the glycidyl or β-methylglycidyl groups are bonded to hetero-atoms, such as above all nitrogen, sulphur or oxygen, with warming, to form an adduct, with 0.1 to at most 0.65, preferably 0.4 to at most 0.6, equivalent of carboxyl groups being employed per 1 equivalent of epoxide groups.

The slightly branched succinic acid 1,4-butanediol polyester (a) possessing carboxyl end groups is customarily manufactured in accordance with the melt process, in which the starting substances are initially introduced in the appropriate quantity ratios and allowed to react under a nitrogen atmosphere at about 150° C. to 160° C. until the theoretical acid equivalent weight is reached.

Both polyhydroxy compounds and polycarboxylic acids can be used as the component causing the branching for the manufacture of branched, acid succinic acid-1,4-butanediol polyesters.

If polyols are used, the manufacture of the polyester takes place according to the following general formulae (a) with succinic acid:

$$z.c\,HO-CH_2-CH_2-CH_2-CH_2-OH+z(c+1)HOOC-CH_2-CH_2-COOH+1R_p-(OH)_z \longrightarrow$$

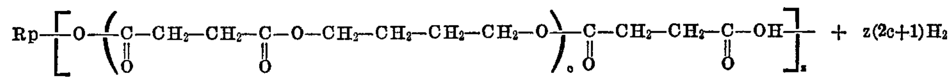

(IIa)

wherein $R_p$ denotes the hydrocarbon radical of a $z$-valent aliphatic or cycloaliphatic polyalcohol or polyphenol obtained by removing the hydroxyl groups, $z$ denotes a number having a value of 3–6, preferably 3 or 4, and the number $c$, which indicates the average number of the structural elements $-[CO(CH_2)_2COO(CH_2)_4-O]-$ per linear branch chain, is so chosen that the average molecular weight of the polyester is about 1,200 to about 20,000.

Advantageously, the product $(c.z)$ is at least 9 and at most 50.

(b) with succinic anhydride:

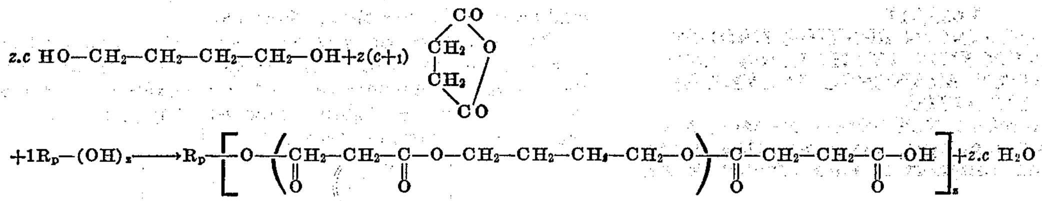

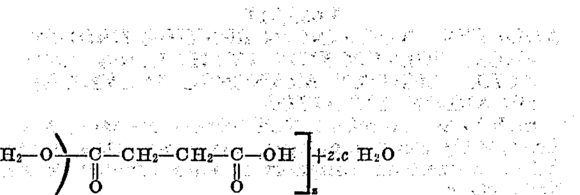

wherein $R_p$, $c$ and $z$ have the same significance as in Formula (IIa).

If polycarboxylic acids are used as branching points in the acid succinic acid-1,4-butanediol polyester, the general formulae for the manufacture of the polyester read as follows:

(a) with succinic acid:

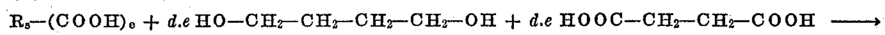

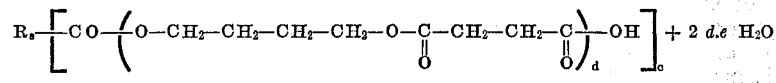

(IIIa)

wherein $R_5$ denotes the hydrocarbon radical of a $e$-valent aliphatic, cycloaliphatic or aromatic polycarboxylic acid obtained by removing the carboxyl groups, $e$ denotes a number having a value of 3 to 6, preferably 3 or 4, and the number $d$, which indicates the average number of the structural elements

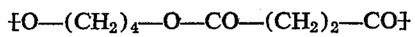

per linear branch chain, is so chosen that the average molecular weight of the polyester is about 1,200 to about 20,000, with the product $(d.e)$ being at least 9 and at most 50.

(b) with succinic anhydride:

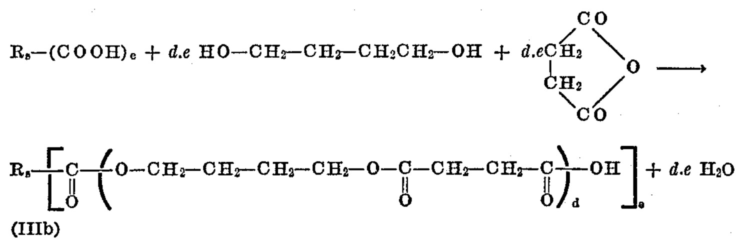

(IIIb)

wherein $R_s$, $d$ and $e$ have the same significance as in Formula (IIIa).

Polyhydric polyalcohols of formula $R_p—(OH)_z$ which serve as starting molecules are for example glycerine, 1,1,1-trimethylolpropane, 1,1,1-trimethylolethane, 1,2,6-hexanetriol, 2,4,6-hexanetriol, 1,2,4-butanetriol, 3-hydroxymethyl-2,4-dihydroxypentane, pentaerythritol, xylitol, mannitol, sorbitol, 3,4,8-trihydroxytetrahydrodicyclopentadiene and 1,2,3-cyclohexanetriol. It is furthermore possible to use polyether-polyalcohols which are obtained by addition of alkene oxides, such as ethylene oxide or propylene oxide, to polyalcohols mentioned above.

As polyhydroxyl compounds of formula $R_p—(OH)_z$ it is furthermore also possible to employ polyphenols, such as pyrogallol, phloroglucinol and hydroxy-hydroquinone (1,2,4-trihydroxybenzene).

Polybasic polycarboxylic acids of formula $R_s(COOH)_e$ which serve as starting molecules are for example trimellitic acid, trimesic acid, aconitic acid, citric acid, tricarballylic acid, 1,2,4-butanetricarboxylic acid, and 1,4,5,8-naphthalenetetracarboxylic acid; instead of the polycarboxylic acids, their anhydrides can optionally be employed.

A small proportion of another dicarboxylic acid, such as for example glutaric acid or adipic acid, and/or of another diol, such as propanediol or hexanediol, can also be incorporated in the polyesters, but the technical properties of the crystalline elastomeric plastics are as a rule worsened by such a modification, or their crystallisation transition point lowered.

The manufacture of the branched, acid polyesters according to general Formulae IIa, IIb, IIIa and IIIb is carried out according to the known melt condensation process. Herein, trifunctional or polyfunctional alcohols [Formula IIa or IIb] or tricarboxylic or polycarboxylic acids [Formula IIIa or IIIb] are mixed with the appropriate amounts of 1,4-butanediol and succinic acid or succinic anhydride and allowed to react under nitrogen at 140–160° C., finally in vacuo, until the calculated acid equivalent weight is reached. The desired chain lengths can be obtained by taking into account the factors $c$ and $z$ or $d$ and $e$. It has furthermore proved advantageous to add a basic catalyst to the reaction mixture when using succinic anhydride. This results in uniform addition of the butanediol to the anhydride.

Preferably, tertiary amines are used as catalysts and these can again be largely removed during the vacuum treatment. Here, pyridine has proved particularly advantageous.

To manufacture the adducts, containing epoxide groups, of polyepoxide compounds and acid, slightly branched polyesters, 0.1–0.65, preferably 0.4–0.6, equivalent of carboxyl groups of the acid polyester are employed per 1 equivalent of epoxide groups. As a rule this is done by simply melting together the polyepoxide compound with the acid polyesters of Formulae IIa and IIb or IIIa and IIIb in the prescribed stoichiometric quantity ratios. As a rule, the temperature range of 100° C. to 200° C., preferably of 130° C. to 180° C., is used for the process.

Possible diepoxide compounds (b) for the manufacture of the new adducts containing epoxide groups are above all those with an average of two glycidyl groups, β-methylglycidyl groups or 2,3-epoxycyclopentyl groups each bonded to a hetero-atom (for example sulphur, preferably nitrogen or oxygen). Furthermore, cycloaliphatic polyepoxide compounds which possess at least one 1,2-epoxide group located on a carbocyclic five-membered or six-membered ring are also suitable for the manufacture of the new adducts containing epoxide groups.

As suitable diepoxide compounds there may for example be mentioned: bis-(2,3-epoxycyclopentyl)-ether, diglycidyl ethers of dihydric aliphatic alcohols, such as 1,4-butanediol or polyalkylene glycols, such as polypropylene glycols; diglycidyl ethers of cycloaliphatic diols, such as 2,2-bis-(4'-hydroxycyclohexyl)-propane, or also of diols, such as 1,1-bis-(hydroxymethyl)-cyclohexene-3, 1,1 - bis - (hydroxymethyl)-cyclohexane, 1,4 - bis - (hydroxymethyl)-cyclohexane, and cis- and trans-quinitol; diglycidyl ethers of dihydric phenols, such as resorcinol, bis-(p-hydroxyphenyl)-methane; 2,2-bis-(p-hydroxyphenyl)-propane (=diomethane), and 2,2-bis-(4'-hydroxy-3',5' - dibromophenyl)-propane; di - ($\beta$-methylglycidyl)-ethers of the abovementioned dihydric alcohols or dihydric phenols; diglycidyl esters of dibasic carboxylic acids, such as adipic acid, sebacic acid, phthalic acid, terephthalic acid, $\Delta^4$-tetrahydrophthalic acid, 4-methyl-$\Delta^4$-tetrahydrophthalic acid, hexahydrophthalic acid, 4-methyl-hexahydrophthalic acid, 3,6-endomethylene-$\Delta^4$-tetrahydrophthalic acid, and 4-methyl-3,6-endomethylene-$\Delta^4$-tetrahydrophthalic acid; N-glycidyl derivatives of amines, amides and heterocyclic nitrogen bases, such as N,N-diglycidyl-aniline and N,N-diglycidyl-toluidine.

Special preference is given to the use of diglycidyl compounds of the N-heterocyclic series of which the heterocyclic ring possesses the grouping $$-\underset{|}{N}-\underset{\|}{\overset{}{C}}-$$
$$\quad\quad O$$

at least once, and wherein the glycidyl groups are directly linked to endocyclic nitrogen atoms. Such polyepoxides are conveniently accessible according to known methods, by reaction of epichlorhydrin or $\beta$-methylepichlorhydrin with heterocyclic urea derivatives, such as especially ethyleneurea, hydantoin, substituted hydantoins, bis(hydantoin) compounds, uracil, substituted uracils or bis(dihydrouracil) compounds in the presence of suitable catalysts, for example tertiary amines.

As such diglycidyl compounds there may especially be mentioned: N,N'-diglycidyl compounds of formula

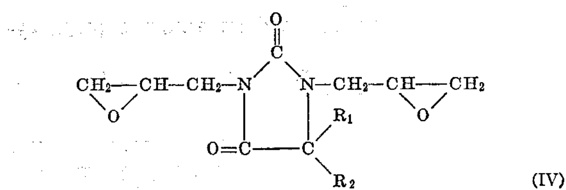

(IV)

wherein $R_1$ and $R_2$ each denote a hydrogen atom or a lower alkyl radical with 1 to 4 carbon atoms. Representatives of this class of compound are, for example, 1,3 - diglycidyl-hydantoin, 1,3-diglycidyl-5-methyl-hydantoin, 1,3-diglycidyl-5-methyl-5-ethyl-hydantoin and especially 1,3-diglycidyl-5,5-dimethyl-hydantoin as well as 1,3-diglycidyl-5-isopropyl-hydantoin.

N,N'-diglycidyl compounds of formula

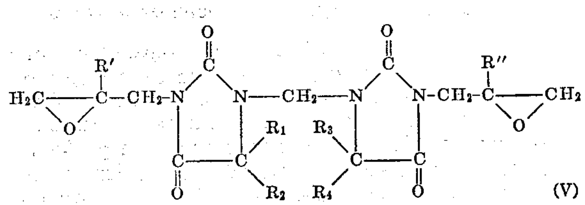

(V)

wherein $R_1$, $R_2$, $R_3$ and $R_4$ each denote a hydrogen atom or a lower alkyl radical with 1 to 4 carbon atoms, and wherein R' and R'' each represent a hydrogen atom or a methyl group; representatives of this class of compound are, for example, bis-(3-glycidyl-5,5-dimethylhydantoinyl-1)-methane and bis-(3-[$\beta$-methylglycidyl]-5,5-dimethylhydantoinyl-1)-methane.

N,N'-diglycidyl compounds of formula

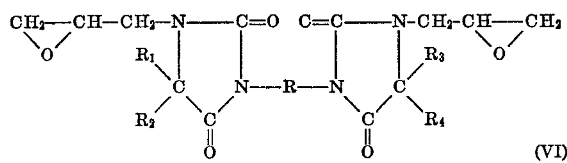

(VI)

wherein R is an aliphatic, cycloaliphatic or araliphatic radical and $R_1$, $R_2$, $R_3$ and $R_4$ each denote a hydrogen atom or a lower alkyl radical with 1 to 4 carbon atoms. Representatives of this class of compound are, for example, bis(1-glycidyl-5,5-dimethylhydantoinyl-3) - methane, 1,4 - bis - (1' - glycidyl - 5',5' - dimethylhydantoinyl-3')-butane, $\beta,\beta'$ - bis-(1-glycidyl-5,5-dimethylhydantoinyl-3)-diethyl-ether.

N,N'-diglycidyl compounds of formula

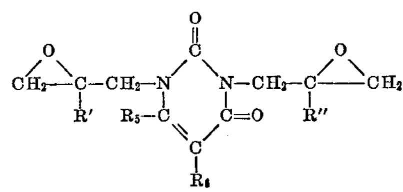

(VII)

wherein $R_5$ and $R_6$ independently of one another each denote a hydrogen atom or a lower alkyl radical with 1 to 4 carbon atoms and wherein R' and R'' each represent a hydrogen atom or a methyl group; representatives of this class of compound are, for example, 1,3-diglycidyl-uracil and 1,3-di-($\beta$-methylglycidyl)-6-methyluracil.

N,N'-diglycidyl compounds of formula

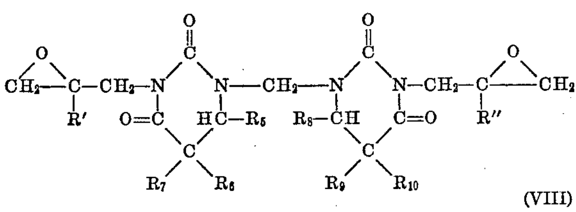

(VIII)

wherein $R_5$, $R_6$, $R_7$, $R_8$, $R_9$ and $R_{10}$ independently of one another each denote a hydrogen atom or a lower alkyl radical with 1 to 4 carbon atoms and wherein R' and R'' each represent a hydrogen atom or a methyl group; representatives of this class of compound are, for example, 1,1' - methylene - bis - (3-glycidyl-5,6-dihydrouracil), 1,1'-methylene-bis-(3-glycidyl-6-methyl-5,6-dihydrouracil) and 1,1' - methylene - bis - (3-[$\beta$-methylglycidyl]-5,6-dihydrouracil).

Amongst the cycloaliphatic epoxide resins which are also suitable and which possess a 1,2-epoxide group located on a carbocyclic ring, there may for example be mentioned those of formulae

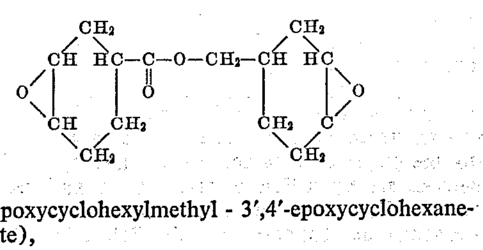

(=3,4 - epoxycyclohexylmethyl - 3',4'-epoxycyclohexane-carboxylate),

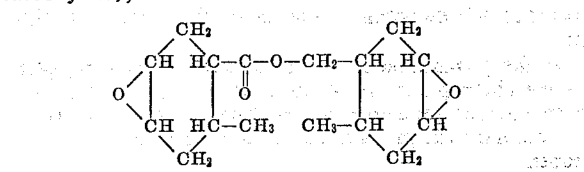

(=3,4 - epoxy - 6 - methylcyclohexylmethyl - 3',4'-epoxy-6'-methylcyclohexanecarboxylate) and

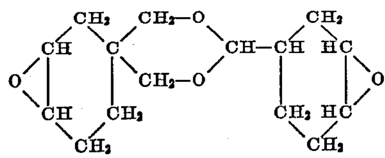

(=3,4 - epoxyhexahydrobenzal - 3',4' - epoxycyclohexane-1',1',-dimethanol).

Of course mixtures of the abovementioned epoxide resins can also be used.

The adducts according to the invention, containing epoxide groups, react with the customary curing agents for polyepoxide compounds. They can therefore be cross-linked by the addition of such curing agents, analogously to other polyfunctional epoxide compounds. As such known curing agents, aliphatic, cycloaliphatic and aromatic polyamines, aliphatic, hydroaromatic and aromatic polycarboxylic anhydrides and also curing catalysts, such as tertiary amines or boron trifluoride complexes, can for example be used.

Preferentially used curing agents are, for example, cycloaliphatic polycarboxylic anhydrides, such as $\Delta^4$-tetrahydrophthalic anhydride, 4-methyl-$\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, 4-methyl - 3,6 - endomethylene-$\Delta^4$-tetrahydrophthalic anhydride (=methylnadicanhydride), and the Diels-Alder adduct of 2 mols of maleic anhydride and 1 mol of 1,4-bis-(cyclopentadienyl)-2-butene, trimellitic anhydride or pyromellitic dianhydride, phthalic anhydride, 3,4,5,6,7,7-hexachlor-3,6-endomethylene-$\Delta^4$-tetrahydrophthalic anhydride, succinic anhydride, adipic anhydride, azelaic anhydride, sebacic anhydride, maleic anhydride and dodecenylsuccinic anhydride, as well as mixtures of the abovementioned anhydrides.

A further preferred class of curing agents are cycloaliphatic polyamines; such suitable polyamines are:

1,2-diaminocyclohexane,
1,4-diaminocyclohexane,
1,3-diaminocyclohexane,
1,2-diamino-4-ethylcyclohexane,
1,4-diamino-3,6-diethylcyclohexane,
1,4-bis(methylamino)cyclohexane,
dodecahydrobenzidine,
N-cyclohexyl-propylenediamine-1,3,
N-cyclohexylethylenediamine,
N,N'-dicyclohexyl-propylenediamine-1,3,
N,N'-dicyclohexyl-diethylenetriamine,
1,8-diamino-p-menthane as well as, especially, 4,4'-diaminodicyclohexylmethane,
3,3'-dimethyl-4,4'-diaminodicyclohexylmethane,
2,2-bis(4'-amino-cyclohexyl)propane,
1-amino-2-aminomethyl-cyclopentane and above all 3 - (aminomethyl) - 3,5,5 - trimethyl - 1 - cyclohexylamine (=isophoronediamine).

Further suitable curing agents are: aliphatic amines, such as monoethanolamine, ethylenediamine, hexamethylenediamine, trimethylhexamethylenediamine, diethylenetriamine, triethylenetetramine, tetraethylenepentamine, N,N-dimethylpropylenediamine-1,3 and N,N-diethylpropylenediamine-1,3; aromatic or araliphatic amines, such as benzidine, o-phenylenediamine, m-phenylenediamine, p-phenylenediamine, 4,4'-diaminodiphenylmethane, 4,4'-diaminodiphenylamine, 4,4' - diaminodiphenyldimethylmethane, 4,4'-diaminodiphenylsulphone or -oxide, 4,4'-diaminodiphenylurea, 2,2' - diaminodiphenylmethane, N-phenylpropylenediamine, bis($\beta$-aminoethyl)-durene, 1,4-bis($\beta$-aminoethyl)-benzene, o-xylylenediamine, p-xylylenediamine, and m-xylylenediamine. Mannich bases, such as 2,4,6-tris-(dimethylaminomethyl)-phenol; $\beta$-aminoethyl-piperazine; adducts of acrylonitrile or monoepoxides, such as ethylene oxide or propylene oxide, to polyalkylenepolyamines, such as diethylenetriamine or triethylenetetramine; adducts of polyamines, such as diethylenetriamine or triethylenetetramine, in excess and polyepoxides, such as bisphenol-A-polyglycidyl ethers; ketimines, for example from acetone or methyl ethyl ketone and bis(p-aminophenyl)methanes; adducts of monophenols or polyphenols and polyamines; polyamides, especially those from aliphatic polyamines, such as diethylenetriamine or triethylenetetramine, and dimerised or trimerised unsaturated fatty acids, such as dimerised linseed oil fatty acid (Versamid); polymeric polysulphide (Thiokol); dicyandiamide or aniline-formaldehyde resins; polyhydric phenols, for example resorcinol, 2,2-bis(4-hydroxyphenyl)propane or phenol-formaldehyde resins, boron trifluoride and its complexes and $BF_3$-amine complexes, for example $BF_3$-monoethylamine complex; acetoacetanilide-$BF_2$ complex; phosphoric acid or triphenyl phosphite.

Curing accelerators can furthermore be employed in curing, and in particular when using polyamides, polymeric polysulphides, dicyandiamide or polycarboxylic anhydrides as curing agents; such accelerators are, for example, tertiary amines, their salts or quaternary ammonium compounds, for example, 2,4,6-tris(dimethylaminomethyl)phenol, benzyldimethylamine, 2-ethyl-4-methylimidazole or triamylammonium phenolate; tin$^{II}$-acylates, such as tin$^{II}$-octoate; or alkali metal alcoholates, such as for example sodium hexanetriolate.

When curing the adducts, containing epoxide groups, according to the invention with carboxylic anhydrides, 0.5 to 1.2 gram equivalent of anhydride groups are appropriately used per 1 gram equivalent of epoxide groups.

The term "curing" as used here denotes the conversion of the above diepoxides into insoluble and infusible cross-linked products, and in particular, as a rule, with simultaneous shaping to give shaped articles such as castings, pressings or laminates or to give two-dimensional structures, such as lacquer films or adhesive bonds.

Curable mixtures which are suitable for the manufacture of shaped articles, including two-dimensional structures, and which contain the adducts, containing epoxide groups, according to the invention, optionally together with a non-plasticised polyepoxide as well as a curing agent for epoxide resins, such as a polyamine or a polycarboxylic anhydride, are therefore also a subject of the present invention.

The adducts according to the invention, like most adduct resin/curing agent mixtures, are crystalline at room temperature and possess a surprisingly high crystallisation transition temperature. The adducts are therefore particularly suitable for uses such as compression moulding compositions, fluidised bed coating powders, laminating resins for the manufacture of storage-stable pre-impregnated fabrics ("prepregs") or adhesives, since the resin/curing agent mixtures possess a surprisingly high storage stability because of the crystallinity of the adducts. The resin/curing agent mixtures can however also be used in accordance with the casting and impregnating process. For example, metallic articles can be potted, with the rubber-like coating adhering well to the metal.

The adducts according to the invention, or their mixtures with other polyepoxide compounds and/or curing agents, can furthermore be provided, in any stage before curing, with customary modifiers such as extenders, fillers and reinforcing agents, pigments, dyestuffs, solvents, flow control agents, agents for conferring thixotropy, flameproofing substances or mould release agents.

Suitable organic solvents for modifying the curable mixtures are, for example, toluene, xylene, butyl acetate, acetone, methyl ethyl ketone and ethylene glycol monobutyl ether.

The following may for example be mentioned as extenders, reinforcing agents, fillers and pigments which can be employed in the curable mixtures according to the invention: glass fibres, boron fibres, carbon fibres, cellulose, polyethylene powder, polypropylene powder, mica, asbestos, quartz powder, slate powder, burnt kaolin, aluminum oxide trihydrate, chalk powder, gypsum, antimony trioxide, bentones, silica aerogel (Aerosil), lithopone, baryte, titanium dioxide, carbon black, graphite, iron oxide or metal powders, such as aluminium powder or iron powder.

The curable mixtures, in the unfilled or filled state, can especially serve as laminating resins, dipping resins, impregnating resins, casting resins or potting and insulating compositions for the electrical industry. They can furthermore be successfully employed for all other technical fields where customary epoxide resins are used, for example as binders, adhesives, paints, lacquers, compression moulding compositions and sintering powders.

In the examples which follow, percentages denote percentages by weight.

The following acid polyesters were used for the manufacture of adducts, containing epoxide groups, described in the examples:

Polyester A 13.8 g. (0.15 mol) of glycerine, 283.4 g. (3.15 mols) of 1,4-butanediol, 360.0 g. (3.60 mols) of succinic anhydride (corresponding to a molar ratio of 1:21:24) and 0.5 ml. of pyridine were mixed fused, together and warmed to 155° C. The temperature was then kept at 155–160° C. for 8 hours under a nirtogen atmosphere and whilst stirring and subsequently the reaction was allowed to continue for 16 hours under 9–11 mm. Hg at 160° C. A crystalline polyester having an acid equivalent weight of 1186 (theory 1336) and a principal melting point of 104° C. resulted; a weaker maximum of the energy absorption at 93° C. can additionally be detected by means of the "differential scanning calorimeter."

Polyester B 61.3 g. (0.66 mol) of glycerine, 1333 g. (14.65 mols+1% excess) of 1,4-butanediol and 1668 g. (16.68 mols) of succinic anhydride (corresponding to a molar ratio of 1:22:25) were mixed with 1.0 ml. of pyridine in a sulphonating flask with descending condenser, whilst stirring, and heated to 120–125° C. under a nitrogen atmosphere. Hereupon an exothermic reaction occurred, which raised the temperature in the reaction mixture to 160–170° C. Thereafter reaction was allowed to continue for 23 hours without a vacuum, at the same temperature, through external heating, in the course of which the bulk of the water of condensation formed, namely 250 g. (theory 264 g.) was split off. Thereafter the reaction mixture was allowed to react for a further 35 hours under 35–50 mm. Hg, in the course of which the acid equivalent weight of the polyester slowly approached the value to be expected theroetically. The reaction was then stopped. A crystalline product having an acid equivalent weight of 1358 (theory 1392) and a melting point of 107° C. resulted.

Polyester C 11.0 g. (0.12 mols) of glycerine, 290.8 (3.24 mols) of 1,4-butanediol and 360.0 g. (3.60 mols) of succinic anhydride (corresponding to a molar ratio of 1:27:30) were mixed with 0.5 ml. of pyridine and warmed to 147° C. under a nitrogen atmosphere and whilst stirring. The temperature was then slowly raised to 165° C. over the course of 9 hours, during which 53 ml. of water (theory 58.0) distilled off. Thereafter the mixture was allowed to continue to react for 22 hours at 11–12, mm. Hg under a waterpump vacuum. A colourless crystalline product having an acid equivalent weight of 1725 and a principal melting point of 107° C. resulted thereby; a further, weaker maximum of the energy absorption at 102° C. was additionally detectable in the "differential scanning calorimeter."

Polyester D 88.8 g. (0.106 mol) of trimerised fatty acid, available under the trade name "Empol 1040," 500 g. (5.0 mols) of succinic anhydride and 459 g. (5.0 mols+2% excess) of 1,4-butanediol (corresponding to a molar ratio of trimerised fatty acid: succinic acid: 1,4-butanediol of 1:50:50) were mixed in a sulphonation flask equipped with a descending condenser and allowed to react under a nitrogen atmosphere at 165° C., with water being split off, until the acid equivalent weight no longer increased further. After 50 hours' reaction time 89 mols (theory: 90 ml.) of distillate, also containing tetrahydrofurane, had been obtained and the acid equivalent weight was 3155 (theory: 3163). The product, which is coloured light brown, is crystalline at room temperature and has a crystallisation transition point of 99°–100° C.

MANUFACTURE OF SHAPED ARTICLES

To determine the tensile strength, either 1 mm. thick sheets were cast and test specimens No. 2 according to ISO R 527 punched therefrom and tested according to ISO, or 4 mm. thick test specimens according to DIN 16,946, Sheet 1 or DIN 53,455, sample shape 5, were manufactured directly and tested using a tearing speed of 50 mm./minute in accordance with this standard specification.

The crystallisation transition temperature (CTT) was determined using a "differenital scanning calorimeter" (DSC 1) of Messrs. Perkin Elmer, at a heating speed of 8° C. per minute. On warming a resin at uniform speed a large absorption of energy by the resin occurs within a relatively small temperature range when the crystals melt. The temperature at which the energy absorption is greatest (maximum of the endothermic surge) is designated the crystallisation transition temperaure (CTT).

EXAMPLE 1

241. g. of polyester A (1.0 equivalent) were stirred for 3 hours at 140° C., under a nitrogen atmosphere, with 77 g. of the N,N'-diglycidyl compound of the following formula

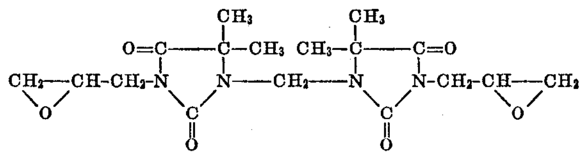

having an epoxide content of 5.07 epoxide equivalents/kg. (epoxide resin I) [corresponding to 1.0 equivalent of carboxyl group per 2.0 equivalents of epoxide group]. A product which was crystalline at room temperature (adduct I) was obtained, showing an epoxide content of 0.686 epoxide equivalent/kg. and a CTT of 100° C.

Cure (a) 145.8 g. of adduct I were warmed to 110° C. with 15.4 g. of hexahydrophthalic anhydride (corresponding to 1.0 equivalent of epoxide group per 1.0 equivalent of anhydride) and after addition of 1.5 g. of a 6% strength solution of the sodium alcoholate of 3-hydroxymethyl-2,4-dihydroxypentane (subsequently described as "sodium hexylate" for brevity) in 3-hydroxymethyl-2,4-dihydroxypentane (subsequently described as "hexanetriol" for brevity), the whole was well mixed. The mixture was now briefly subjected to a vacuum to remove the air bubbles and then poured into prewarmed aluminium moulds of size 135 x 135 x 1 mm. treated with a release agent. After a heat treatment of 16 hours at 140° C. crystalline, rubbery-elastic shaped articles having the following properties were obtained:

tensile strength according to ISO R 527—270 kg./cm.²
elongation at break according to ISO R 527—290%
CTT—67° C.

(b) On curing 145.8 of adduct I with 1.0 equivalent of phthalic anhydride instead of 1.0 equivalent of hexahydrophthalic anhydride and otherwise the same composition and processing as in Example 1(a), rubbery-elastic shaped articles having the following properties were obtained:

tensile strength according to ISO R 527—190 kg./cm.²
elongation at break according to ISO R 527—250%
CTT—75° C.

(c) On curing 145.8 g. of adduct I with 1.0 equivalent of dodecenylsuccinic anhydride instead of 1.0 equivalent of hexahydrophthalic anhydride and otherwise the same composition and processing as in Example 1(a), shaped articles having the following properties were obtained:

tensile strength according to ISO R 527—245 kg./cm.²
elongation at break according to ISO R 527—300%
CTT—72° C.

(d) 145.8 g. of adduct I were warmed to 110° C. and well mixed with 4.95 g. of 4,4′-diaminodiphenylmethane (corresponding to 1.0 equivalent of epoxide group per 1.0 equivalent of nitrogen-bonded active hydrogen atoms). After a brief vacuum treatment, the mixture was poured into the prewarmed moulds according to Example 1(a) and subjected to a heat treatment of 16 hours at 140° C. Shaped articles having the following properties were obtained:

tensile strength according to ISO R 527—210 kg./cm.²
elongation at break according to ISO R 527—200%
CTT—84° C.

(e) 145.8 g. of adduct I were warmed to 110° C., mixed with 5.96 g. of bis-(4-amino-3-methylcyclohexyl)methane (corresponding to 1.0 equivalent of epoxide group per 1.0 equivalent of nitrogen-bonded active hydrogen atoms), and the mixture immediately cooled to about 80° C. and, after a brief vacuum treatment, poured into the moulds according to Example 1(a). After a heat treatment of 16 hours at 100° C., shaped articles having the following properties were obtained:

tensile strength according to ISO R 527—280 kg./cm.²
elongation at break according to ISO R 527—310%
CTT—85° C.

EXAMPLE 2

195 g. of polyester A (1.0 equivalent) were stirred for 3 hours at 140° C., under a nitrogen atmosphere, with 48.2 g. of 1,4-butanediol-diglycidyl-ether having an epoxide content of 7.4 epoxide equivalents/kg. (epoxide resin II) [corresponding to 1.0 equivalent of carboxyl group per 2.2 equivalents of epoxide group]. The reaction product was crystalline at room temperature and had an epoxide content of 1.198 epoxide equivalents/kg. and a CTT of 99° C. (adduct II).

Cure 83.5 g. of adduct II were warmed to 110° C. and well mixed with 15.4 g. of hexahydrophthalic anhydride (corresponding to 1.0 equivalent of anhydride per 1.0 equivalent of epoxide group) as well as with 0.84 g. of a 6% strength solution of "sodium hexylate" in "hexanetriol," and the mixture was briefly subjected to a vacuum and poured into the prewarmed moulds according to Example 1(a). After a heat treatment of 16 hours at 140° C., shaped articles having the following properties were obtained:

tensile strength according to ISO R 527—95 kg./cm.²
elongation at break according to ISO R 527—150%
CTT—77° C.

EXAMPLE 3

340 g. of polyester B were stirred for 3 hours at 140° C., under a nitrogen atmosphere, with 81 g. of epoxide resin I (corresponding to 2.0 equivalents of epoxide group per 1.0 equivalent of carboxyl group). A crystalline product (adduct III) having the following properties was obtained:

epoxide content—0.533 epoxide equivalent/kg.
CTT—101° C.

Cure (a) 188 g. of the adduct III were warmed to 110° C. and well mixed with 17.8 g. of methylnadic anhydride (corresponding to 1.0 equivalent of anhydride per 1.0 equivalent of epoxide group), and the mixture was briefly subjected to a vacuum and poured into the prewarmed moulds according to Example 1(a). After a heat treatment of 16 hours at 140° C., crystalline and elastic shaped articles having the following properties were obtained:

tensile strength according to ISO (1 mm.)—233 kg./cm.²
elongation at break according to ISO (1 mm.)—400%
CTT—90° C.

(b) On using 1.0 equivalent of dodecenylsuccinic anhydride instead of 1 equivalent of methylnadic anhydride and otherwise the same composition and processing as in Example 3(a), elastic and tough, crystalline shaped articles having the following properties were obtained:

tensile strength according to ISO (1 mm.)—227 kg./cm.²
elongation at break according to ISO (1 mm.)—400%
CTT—89° C.

(c) On using 0.5 equivalent of hexahydrophthalic anhydride and 0.5 equivalent of sebacic acid instead of 1.0 equivalent of methylnadic anhydride and otherwise the same composition and processing as in Example 3(a), shaped articles having the following properties were obtained:

tensile strength according to ISO (1 mm.)—117 kg./cm.²
elongation at break according to ISO (1 mm.)—400%
CTT—95° C.

EXAMPLE 4

367 g. of polyester C were stirred for 2 hours at 150° C. with 84.5 g. of epoxide resin I (corresponding to 2 equivalents of epoxide group per 1.0 equivalent of acid polyester) under a nitrogen atmosphere. A light crystalline product (adduct IV) having the following properties was obtained:

epoxide content—0.599 epoxide equivalent per kg.
CTT—104° C. (subsidiary maxima at 89° and 100° C.)
acid equivalent weight—3900

Cure (a) 83.5 g. of adduct IV were warmed to 130° C. and well mixed with 7.7 g. of hexahydrophthalic anhydride (corresponding to 1.0 equivalent of epoxide group per 1.0 equivalent of anhydride) as well as 0.83 g. of a 6% strength solution of "sodium hexylate" in "hexanetriol," and the mixture was briefly subjected to a vacuum and poured into the prewarmed moulds according to Example 1(a). After a heat treatment of 16 hours at 140° C., crystalline, elastic shaped articles having the following properties were obtained:

tensile strength according to ISO (1 mm.)—166 kg./cm.²
elongation at break according to ISO (1 mm.)—370%
CTT—88° C.

(b) 83.5 g. of adduct IV were warmed to 120° C. and well mixed with a mixture of 70 g. of bis-(4-aminocyclohexyl)-methane and 30 g. of bis-(4-amino-3-methylcyclohexyl)-methane (corresponding to 1.0 equivalent of epoxide group per 1.0 equivalent of nitrogen-bonded active hydrogen atoms), and the mixture was briefly subjected to a vacuum and poured into the prewarmed moulds according to Example 1(a). After a heat treatment of 16 hours at 140° C., crystalline, elastic, hard rubbery shaped articles having the following properties were obtained:

tensile strength according to ISO (1 mm.)—220 kg./cm.$^2$
elongation at break according to ISO (1 mm.)—180%
CTT—98° C.

EXAMPLE 5

359 g. of polyester C. were stirred for 1 hour at 140° C. with 63.3 g. of diglycidyl-5,5-dimethylhydantoin having an epoxide content of 7.93 epoxide equivalents/kg. (epoxide resin III) [corresponding to 1.0 equivalent of carboxyl group per 2 equivalents of epoxide group] under a nitrogen atmosphere. A light, crystalline product (adduct V) having a melting point of 106° C. and an epoxide content of 0.48 epoxide equivalent per kg. was obtained.

Cure (a) 208 g. of adduct V were warmed to 130° C. and well mixed with 17.8 g. of methylnadic anhydride (corresponding to 1.0 equivalent of epoxide group of the adduct per 1.0 mol of anhydride). After being briefly subjected to a vacuum, the mixture was poured into the prewarmed moulds according to to Example 1(a) and cured for 16 hours at 160° C. Tough to rubbery, crystalline shaped articles having the following properties were obtained:

CTT—91° C.
tensile strength according to ISO (1 mm.)—230 kg./cm.$^2$
elongation at break according to ISO (1 mm.)—330%

(b) On using 5.90 g. of bis-(4-amino-3-methylcyclohexyl)-methane (1.0 equivalent of active H atom) instead of 17.8 g. of methylnadic anhydride and otherwise the same composition and processing as in Example 5(a), somewhat stiffer shaped articles having the following properties were obtained:

CTT—97° C.
tensile strength according to ISO (1 mm.)—190 kg./cm.$^2$
elongation at break according to ISO (1 mm.)—100%

EXAMPLE 6

258 g. of polyester C were stirred for 1 hour at 140° C. under a nitrogen atmosphere with 67.5 g. of diomethane-di-($\beta$-methylglycidyl)-ether having an epoxide content of 4.43 epoxide equivalents per kg. (epoxide resin IV) [corresponding to 1 equivalent of carboxyl group per 2 equivalents of epoxide groups] and 0.05 g. of a 50% strength solution of tetramethylammonium chloride in water. A light, crystalline product (adduct VI) having a melting point of 104° C. and an epoxide content of 0.88 epoxide equivalent per kg. was obtained.

Cure 113.7 g. of adduct VI were warmed to 130° C. and well mixed with 15.4 g. of hexahydrophthalic anhydride (corresponding to 1.0 equivalent of epoxide group per 1.0 equivalent of anhydride). After a brief vacuum treatment, the mixture was poured into the prewarmed moulds according to Example 1(a) and cured for 16 hours at 160° C. Tough to rubbery shaped articles having the following properties were obtained:

CTT—90° C.
tensile strength according to ISO (1 mm.)—210 kg./cm.$^2$
elongation at break according to ISO (1 mm.)—430%

EXAMPLE 7

315.5 g. of polyester D (1.0 equivalent of carboxyl group) were stirred for 1.5 hours at 140° C. with 40 g. of epoxide resin I (2.0 equivalents of epoxide group). A crystalline adduct (adduct VII) having a melting point of 110° C. and an epoxide content of 0.5 epoxide equivalent per kg. was obtained.

Cure 200 g. of adduct VII (1.0 equivalent) were warmed to 130° C. and well mixed with 26.6 g. of dodecenylsuccinic anhydride (1.0 mol). After a brief vacuum treatment, the mixture was poured into the prewarmed moulds according to Example 1(a) and cured for 16 hours at 160° C. Very tough, rubbery shaped articles having the following properties were obtained:

CTT—98° C.
tensile strength according to ISO (1 mm.)—200 kg./cm.$^2$
elongation at break according to ISO (1 mm.)—370%

EXAMPLE 8

344 g. of polyester C. (2.0 equivalents of carboxyl group) were stirred with 68.2 g. of $\Delta^4$-tetrahydrophthalic acid diglycidyl ester having an epoxide content of 6.45 epoxide equivalents per kg. (epoxide resin V) for 1 hour at 140° C., under a nitrogen atmosphere. A crystalline product having a melting point of 105° C. and an epoxide content of 0.48 epoxide equivalent/kg. (adduct VIII) was obtained.

Cure 208 g. of adduct VIII were warmed to 130° C. and well mixed with 15.4 g. of hexahydrophthalic anhydride (corresponding to 1.0 equivalent of carboxyl group per 2.2 equivalents of epoxide group). After a brief vacuum treatment, the mixture was poured into the prewarmed moulds according to Example 1(a). After a heat treatment of 16 hours at 160° C., shaped articles having the following properties were obtained:

CTT—83° C.
tensile strength according to ISO (1 mm.)—170 kg./cm.$^2$
elongation at break according to ISO (1 mm.)—250%

EXAMPLE 9

69.5 g. of a cycloaliphatic epoxide resin of the following structure

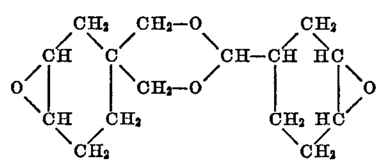

(=3,4 - epoxyhexahydrobenzal - 3',4' - epoxycyclohexane - 1',1' - dimethanol) having an epoxide content of 6.4 epoxide equivalents/kg. (epoxide resin VI) were stirred with 394 g. of polyester C for 1 hour at 140° C. A crystalline product having a melting point of 105° C. and an epoxide equivalent of 7.04/kg. (adduct IX) was obtained.

Cure 142 g. of adduct IX (1.0 equivalent) were warmed to 130° C. and well mixed with 26.6 g. of dodecenylsuccinic anhydride (1.0 mol). After a brief vacuum treatment, the mixture was poured into the prewarmed moulds according to Example 1 and cured for 16 hours at 160° C. Shaped articles were obtained, which only crystallised after some hours. The crystalline, rubbery articles had the following properties:

CTT—85° C.
tensile strength according to ISO (1 mm.)—110 kg./cm.$^2$
elongation at break according to ISO (1 mm.)—180%

We claim:

1. An adduct containing at least two epoxides per molecule which is obtained by reacting (a) a slightly branched polyester, possessing terminal carboxyl groups and having an average molecular weight of about 1,200 to about 20,000, which consists of 99 to 90 mol percent of the structural element of formula

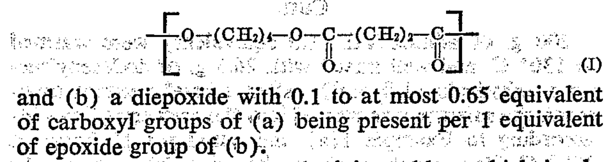

and (b) a diepoxide with 0.1 to at most 0.65 equivalent of carboxyl groups of (a) being present per 1 equivalent of epoxide group of (b).

2. An epoxide groups containing adduct which is obtained by reacting (a) a slightly branched polyester, possessing terminal carboxyl groups and having an average molecular weight of about 1,200 to about 20,000, which consists of 99 to 90 mol percent of the structural element of formula

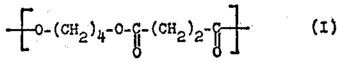

and (b) a diepoxide, with 0.4 to 0.6 equivalent of carboxyl groups of (a) being present per 1 equivalent of epoxide group of (b).

3. An adduct as claimed in claim 1, which is derived from a polyester (a) of average formula

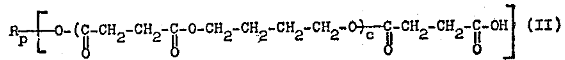

wherein $R_p$ denotes the hydrocarbon radical of a *z*-hydric aliphatic or cycloaliphatic polyalcohol or polyphenol obtained by removing the hydroxy groups, *z* denotes a number having a value of 3–6 and the number *c*, which indicates the average number of the structural elements

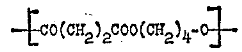

per linear branch chain, is so chosen that the average molecular weight of the polyester is about 1,200 to about 20,000.

4. An adduct as claimed in claim 1, which is derived from a polyester (a) of average formula

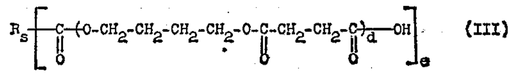

is used, wherein $R_s$ denotes the hydrocarbon radical of a *e*-basic aliphatic, cycloaliphatic or aromatic polycarboxylic acid obtained by removing the carboxyl groups, *e* denotes a number having a value of 3 to 6 and the number *d*, which indicates the average number of the structural elements

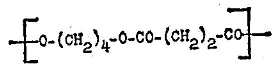

per linear branch chain, is so chosen that the average molecular weight of the polyester is about 1,200 to about 10,000.

5. An adduct as claimed in claim 1, which is derived from a diepoxide (b), which per molecule possesses an average of two glycidyl or β-methylglycidyl groups each bonded to a nitrogen, sulphur or oxygen atom.

6. An adduct as claimed in claim 1, which is derived from a cycloaliphatic diepoxide which per molecule possesses an average of two 1,2-epoxide groups each bonded to a carbocyclic ring, as diepoxide (b).

7. An adduct as claimed in claim 5, wherein the diepoxide (b) is a diglycidyl compound of the N-heterocyclic series of which the heterocyclic ring possesses the grouping $$-N-\underset{\underset{O}{\|}}{C}-$$

at least once, and wherein both glyciryl groups are directly linked to endocyclic nitrogen atoms.

8. An adduct as claimed in claim 5, wherein the diepoxide (b) is a diglycidyl ether of a diol or diphenol.

9. An adduct as claimed in claim 5, wherein the diepoxide (b) is a diglycidyl ester of a dibasic carboxylic acid.

10. An adduct as claimed in claim 6, wherein the diepoxide (b) is 3,4 - epoxyhexahydrobenzal - 3′,4′ - epoxycyclohexane-1′,1′-dimethanol.

11. An adduct as claimed in claim 7, wherein the diepoxide (b) in 1,1′ - methylene - bis - (3 - glycidyl-5,5-dimethylhydantoin).

12. An adduct as claimed in claim 7, wherein the diepoxide (b) is N(1), N(3) - diglycidyl - 5,5 - dimethylhydantoin.

13. An adduct as claimed in claim 8, wherein the diepoxide (b) is 1,4-butanediol-diglycidyl-ether.

14. An adduct as claimed in claim 8, wherein the diepoxide (b) is diomethane-di-(β-methylglycidyl)-ether.

15. An adduct as claimed in claim 9, wherein the diepoxide (b) is tetrahydrophthalic acid diglycidyl ester.

16. An adduct as claimed in claim 1 which additionally contains a basic accelerator.

17. An adduct as claimed in claim 16, wherein the accelerator is a tertiary amine.

18. A heat-curable composition of matter, comprising (1) an adduct, containing epoxide groups, as claimed in claim 1, and (2) a curing agent for the adduct (1), selected from the group consisting of a polyamine and a polycarboxylic anhydride.

References Cited

UNITED STATES PATENTS

| | | | |
|---|---|---|---|
| 3,027,279 | 3/1962 | Kurka | 260—835 |
| 3,529,034 | 9/1970 | Groff | 260—835 |
| 3,576,903 | 4/1971 | Groff | 260—835 |

PAUL LIEBERMAN, Primary Examiner

U.S. Cl. X.R.

260—2 Ep, 18 Ep, 22 Ep, 37 Ep, 40 R, 47 Ep, 47 R, 75 Ep, 830 TW, 830 P, 830 S, 831, 834; 156—330; 161—184

PO-1050
(5/69)

UNITED STATES PATENT OFFICE
CERTIFICATE OF CORRECTION

Patent No. 3,655,817 Dated April 11, 1972

Inventor(s) FRIEDRICH LOHSE ET AL

It is certified that error appears in the above-identified patent and that said Letters Patent are hereby corrected as shown below:

Column 1, line 9, after "Switzerland" insert --- assignors to CIBA-GEIGY AG, Basel Switzerland ---.

Signed and sealed this 19th day of March 1974.

(SEAL)
Attest:

EDWARD M.FLETCHER,JR.
Attesting Officer

C. MARSHALL DANN
Commissioner of Patents